Nov. 27, 1934. K. W. GASKILL Re. 19,382

FLUID OPERATED GEAR SHIFTING MECHANISM

Original Filed Oct. 28, 1929 2 Sheets-Sheet 1

INVENTOR
KENNETH W. GASKILL.

Milburn and Milburn
ATTORNEYS

Nov. 27, 1934. K. W. GASKILL Re. 19,382
FLUID OPERATED GEAR SHIFTING MECHANISM
Original Filed Oct. 28, 1929 2 Sheets-Sheet 2
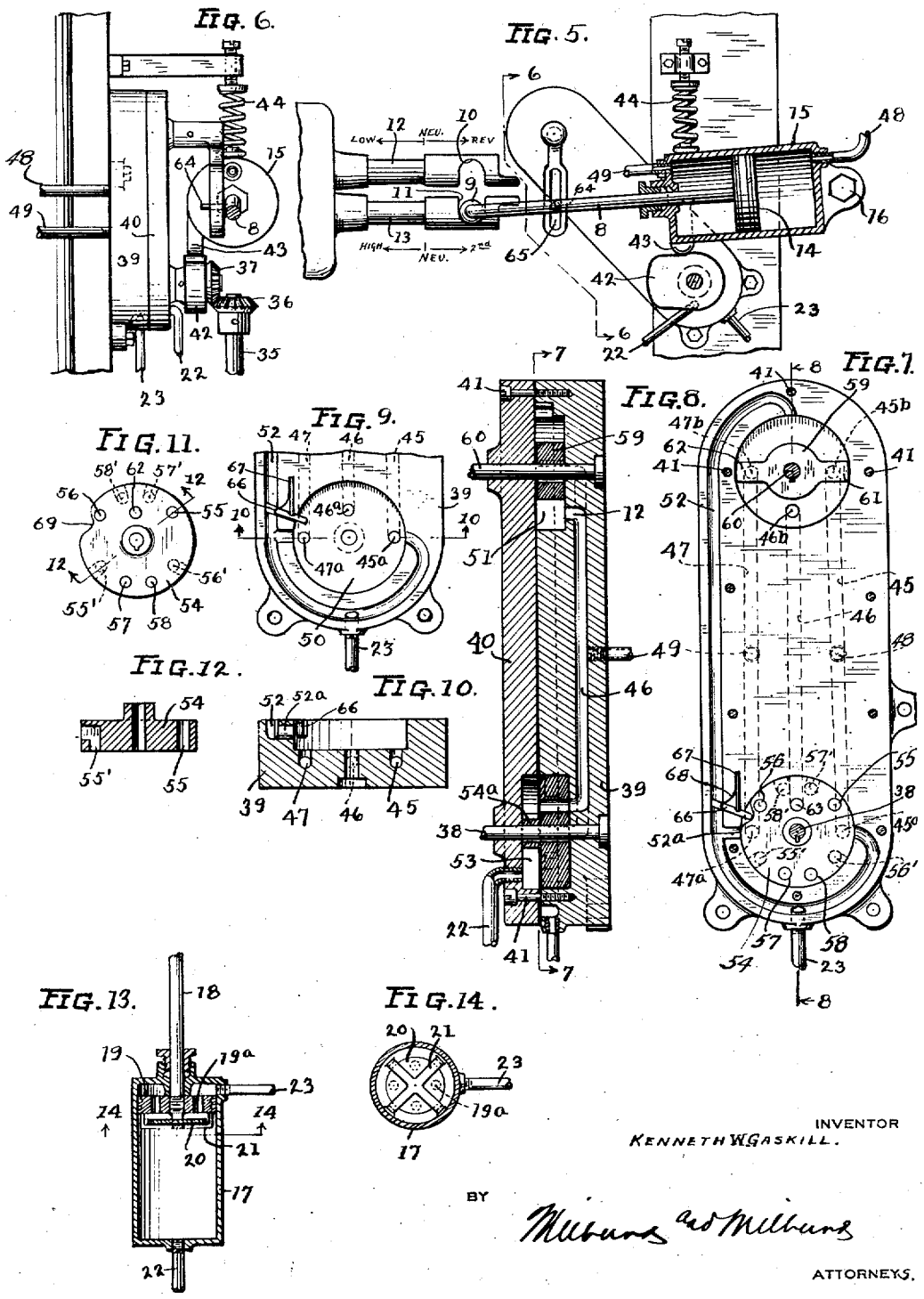
INVENTOR
KENNETH W. GASKILL.
BY Milburn and Milburn
ATTORNEYS.

Reissued Nov. 27, 1934 Re. 19,382

UNITED STATES PATENT OFFICE 19,382

FLUID OPERATED GEAR-SHIFTING MECHANISM

Kenneth W. Gaskill, Cleveland, Ohio

Original No. 1,820,452, dated August 25, 1931, Serial No. 403,104, October 28, 1929. Application for reissue August 23, 1933, Serial No. 686,467

15 Claims. (Cl. 74—334)

This invention relates to a hydraulic form of mechanism for shifting gears adapted especially for use in connection with an automobile.

Whereas, in the present standard form of automobile, the gears are shifted by first depressing the clutch and then manipulating a hand lever for actually changing the gear ratio, in the present device, this hand lever may be entirely dispensed with and the gear ratio may be changed by depression of the clutch pedal as a continuation of the same operation employed for disconnecting the engine from the drive shaft. In other words, with the present arrangement, it is contemplated to provide an adjustable means within easy reach of the hand of the operator, which can be set for any gear ratio desired and then upon depression of the clutch pedal, the change in the gear combination may be effected without the employment of any other lever.

The present invention contemplates the employment of a hydraulic means, as for instance oil, which may be compressed upon depression of the clutch pedal to effect adjustment of the gears in the transmission, the selection of the proper gear ratio and the determination of the proper channels for delivery of the fluid pressure so as to effect such change in the gear ratio, being effected by means of a distributor which can be set by means of a hand lever arranged in the vicinity of the steering wheel.

It is therefore the object of the present invention to provide such a hydraulic means for shifting the gears into any one of the gear ratios as now found in the standard form of transmission, together with a means for first setting a suitable form of distributor for selecting the path of the fluid for operation of such mechanism, such operation to be effected upon full depression of the clutch pedal.

A further object is to devise such a form of mechanism which may be arranged entirely beneath the floor board of the automobile and which may be practically free of any parts which are apt to get out of order or to lack dependability in operation.

A further object is to devise such a form of mechanism in which the clutch pedal may be partly depressed so as to disconnect the engine from the drive shaft, without setting into operation the gear shift mechanism until the clutch pedal has been more fully depressed, should occasion demand.

Other objects will be apparent from the following description and claims when considered together with the accompanying drawings.

Figure 1:
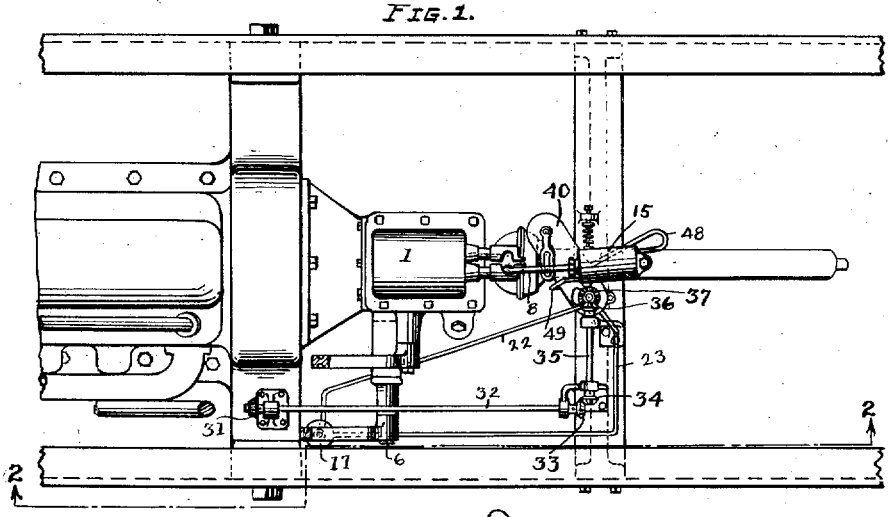
Figure 2:
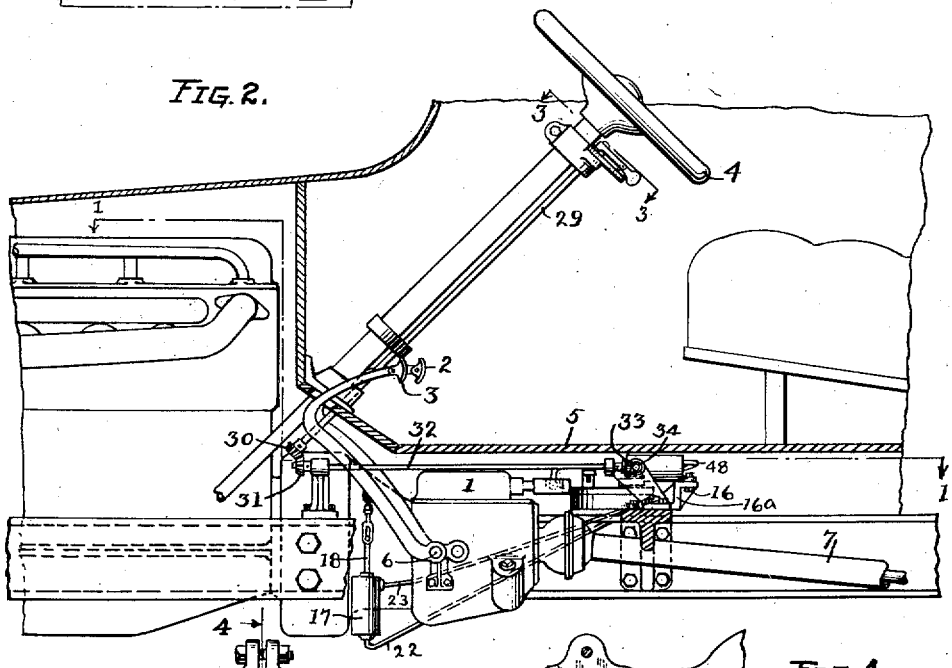
Figure 3:
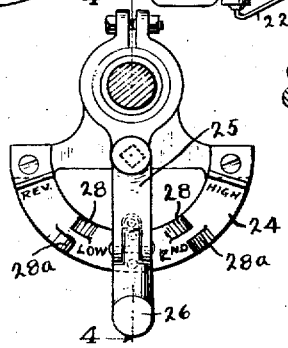
Figure 4:
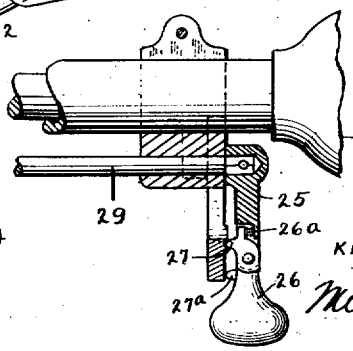

Fig. 1 is a view taken on line 1—1 of Fig. 2;
Fig. 2 is a view taken on line 2—2 of Fig. 1;
Fig. 3 is a view taken on line 3—3 of Fig. 2;
Fig. 4 is a view taken on line 4—4 of Fig. 3;
Fig. 5 is an enlarged view of a portion of Fig. 1 partly shown in section;
Fig. 6 is a view taken on line 6—6 of Fig. 5;
Fig. 7 is a view taken on line 7—7 of Fig. 8;
Fig. 8 is a view taken on line 8—8 of Fig. 7;
Fig. 9 corresponds to a portion of Fig. 7 with the rotatable disk removed;
Fig. 10 is a view taken on line 10—10 of Fig. 9;
Fig. 11 is a plan view of the rotatable disk;
Fig. 12 is a view taken on line 12—12 of Fig. 11;
Fig. 13 is a vertical sectional view of the compression cylinder arranged for operation in conjunction with the clutch pedal; and
Fig. 14 is a view taken on line 14—14 of Fig. 13.

The present invention is here shown in conjunction with the present "standard" form of gear shift embodying the transmission 1 in which is enclosed the gear combinations including first or low gear, second or intermediate gear, third or high gear, as well as reverse gear and neutral. The positions of the several gears embodied in the transmission are the same in the present case as in the "standard" form of gear shift and they are therefore not here illustrated. However, in Fig. 5, there are indicated the relative positions of the same with reference to the means for shifting the same.

In the present arrangement, there are provided also the brake pedal 2 which may be operated in the same manner as in the present form of automobile, and the clutch pedal 3 which may likewise be operated in the same customary manner. The regular form of steering wheel is indicated by reference numeral 4. As will be seen from the drawings, especially Fig. 1, there is not here required the customary gear shift lever. The entire gear shift mechanism in the present case is arranged beneath the floor board 5 which may be removed whenever desired for access thereto. The clutch pedal is pivotally mounted at the point 6 and is adapted to control the clutch which is arranged in the same customary manner for connecting or disconnecting the engine from the drive shaft 7. In the present arrangement there is no change required in the position or construction of the engine which is therefore here indicated only in a general way in Figs. 1 and 2.

The means for effecting adjustment of the gears so as to change their ratio in the transmission, comprises the plunger rod 8 provided with the enlarged rounded end portion 9 adapted for seating engagement in the recesses 10 and 11 formed in the end portions of the rearwardly extending rods 12 and 13 connected with the gears within the transmission. The parts in the position indicated in Fig. 5 are in neutral and accordingly the plunger 14 on the other end of the rod 8 is midway of the length of the cylinder 15. This cylinder is mounted for rocking adjustment about the point 16 on a suitable bracket 16[a] provided upon the frame of the chassis. The means for providing pressure upon either side of the piston 14 for movement of the same in one direction or the other within the cylinder 15, comprises a cylinder 17 which is arranged below the clutch pedal 3 and has its plunger rod 18 connected to the clutch pedal for actuation thereby upon depression of the same. The plunger 19 is provided upon the rod 18 and is provided with apertures 19[a] therethrough. These apertures are adapted to be closed by disk 20 arranged upon the under side of plunger 19, the disk 20 being held in such position by means of the strips 21 secured to the under side of the plunger 19, as indicated in Figs. 13 and 14. Thus, there is provided a one-way valve through the plunger 19 which will be closed upon downward movement of the same so as to effect compression of the fluid within the cylinder 17 and to transmit such compression through the pipe 22. Upon release of the clutch pedal which will automatically return to raised or idle position, as is now customary in the standard automobile construction, the valve through the piston 19 will be open so as to permit passage of the fluid therethrough. At this time, disk 20 is supported upon the strips 21, as indicated in Fig. 13. Any suitable form of opening may be provided for supplying the fluid to the cylinder 15.

As a means of determining the connections between the cylinders 15 and 17 so as to regulate the distribution of the fluid pressure according to the direction and extent of movement desired for the piston 14, I have provided a distributing mechanism which can be adjusted into proper position according to the connections desired. This distributor is illustrated especially upon sheet 2 of the drawings and is controlled by means of a hand lever arranged in close proximity to the steering wheel 4. As illustrated in Fig. 3, there is provided upon the upper part of the steering post, a rack 24 upon which are indicated the several positions to which the control lever may be moved for selectively establishing the proper path of compression for the desired change in the gear ratio. Fig. 3 shows the control lever in neutral position, this lever being indicated by reference numeral 25 and being provided with a spring-pressed latch means 26 for maintaining the same in set position. The latch comprises projections 27 and 27[a] adapted to engage in depressions 28 and 28[a], respectively, provided at the different points about the rack 24. Spring 26[a] normally forces projection 27 downwardly and projection 27[a] upwardly. Depressions 28 are graduated upwardly towards neutral position while depressions 28[a] are graduated upwardly in the opposite direction. The other ends of the depressions are formed as abrupt shoulders, as indicated in Fig. 3. The lever 25 is mounted upon one end of the adjusting rod 29 which may extend along the outside or the inside of the steering post and which, at its lower end, has a bevel gear 30 meshing with the bevel gear 31 upon the horizontally extending shaft 32 beneath the floor board. The other end of this shaft has a bevel gear 33 meshing with the bevel gear 34 upon the shaft 35 which in turn has a bevel gear 36 adapted to operate the bevel gear 37 on the shaft 38 for operation thereof. Shaft 38 is mounted in the one end portion of the distributor which in a general way comprises the casting 39 and the plate 40 secured thereto by means of the screw bolts 41. The distributor is arranged beneath the floor board, as clearly indicated in Figs. 1 and 2, and is mounted upon the same corresponding member of the chassis frame as the bracket 16[a]. The distributor is in close proximity to the cylinder 15, and upon the shaft 38 there is mounted the cam 42 adapted to engage the projection 43 upon the side of the cylinder 15 for automatically rocking the same about its pivot 16 against the tension of the spring 44 in order to shift the plunger shaft laterally and cause the end portion 9 to engage in the recess 10, as may be required for effecting the desired gear ratio.

The casting 39 is provided with the three parallel longitudinally extending channels 45, 46, and 47. The channel 45 has a pipe connection 48 with the one end of the cylinder 15 while the channel 47 has a pipe connection 49 with the other end of the cylinder 15. The channels 45, 46, and 47 open at one end in the chamber 50 provided in the casting 39, as indicated at 45[a], 46[a], and 47[a], and these channels open at their other ends in the chamber 51 formed in the other end of the casting 39, as indicated at 45[b], 46[b], and 47[b]. There is provided also in the casting 39 the by-pass channel 52 which opens at its two ends in the chambers 50 and 51, respectively, through the side walls thereof. The pipe 23 is connected at its one end with the by-pass 52 while at its other end it is connected to the one end of the cylinder 17. The other end of the pipe 22, which is connected with the other end of the cylinder 17, has connection with the chamber 53 provided upon the inner side of the plate 40. The chamber 53 is arranged in registering relation with the chamber 50, and the communication between these two chambers, as well as through the channels just referred to, is controlled by means of the rotatable disk 54 which is mounted upon the post 38 and which seats within the chamber 50. This disk is provided with a hub 54[a] which extends through the chamber 53. The disk 54 is provided with the ports 55, 56, 57, and 58, which extend entirely through the body thereof. These ports, upon rotatable adjustment of the disk 54 are adapted to be brought into registry with the ends of the channels 45 and 47. The disk 54 is provided also with the angular ports 55′, 56′, 57′, and 58′ which are arranged diametrically opposite the ports 55, 56, 57, and 58, respectively. The angular ports 55′, 56′, 57′, and 58′ are adapted, upon rotatable adjustment of the disk 54, to provide communication between the channels 45 and 47 and the by-pass 52 either at the one end thereof or through the auxiliary branch 52[a] of the by-pass which is arranged diametrically opposite to the one end of the by-pass 52, as clearly indicated in Fig. 7.

Arranged within the chamber 51 is the valve member 59 mounted for rotatable adjustment upon the post 60. This valve member has the two diametrically extending arms 61 and 62 which are adapted in one position to extend across and close the ends 45[b] and 47[b] of the channels 45 and 47, respectively. This position is indicated in Fig. 7. When the valve 59 is in such position, the channel 46 is permitted to open at 46[b] into the chamber 51, as indicated in Fig. 8. Likewise, in the corresponding position of the disk 54, the other end of the channel 46 is permitted to register with the port 63 in the disk 54 and thereby communicates with chamber 53. The purpose of the valve 59 is to maintain the ends $45^b$ and $47^b$ of the channels 45 and 47 closed and this particular means is depended upon when the device is in neutral, as will appear. The means for automatically effecting rotatable adjustment of the valve 59 comprises a pin 64 on the plunger rod 8, this pin engaging in the slotted arm 65 mounted upon the post 60.

As a means of ensuring transmission of pressure through pipes 48 and 49 when the valve 59 opens the ends $45^b$ and $47^b$ of the channels 45 and 47, I have provided an automatically operated valve 66 which has a notched portion engaging over the edge of a member 67 fixed in the casting and to which there is fastened the one end of the spring 68, the other end of which is connected to the valve member 66. The rear end of the valve member 66 extends into the path of the rotatable disk 54 which is notched, as indicated at 69, for receiving the rear end portion of the valve 66 when the parts are in neutral position. As will appear in the following explanation, the valve 66 is permitted to be open when the parts are in neutral position but the valve 66 will be automatically closed to prevent escape of fluid pressure therethrough when the disk 54 occupies any other position. This is accomplished by the inner end of the valve 66 being engaged by the full edge portion of the disk 54 as it rotates in either direction. Such engagement causes effective closure between the valve 66 and the wall of the by-pass. In this way, there is prevented the escape or equalization of the pressure and as a result, the pressure may be distributed in an effective manner through the channels just referred to so as to be impressed upon either side of the plunger 14 in effecting the desired change in the gear ratio.

The operation of the present device will now be briefly described. Assuming that the mechanism is in neutral position, as indicated in Fig. 5 of the drawings, then in order to shift to low gear, control lever arm 25 is moved to the left, as viewed in Fig. 3, to the position indicated as "low". Projection 27 will thus be moved down into depression 28 and lever 25 can not be moved past "low" position without depressing arm 26 so as to raise projection to permit the same to pass out of depression 28. Such manipulation will, through the operating connections already described, cause the cam member 42 to rotate in a clockwise direction and move the cylinder 15 about its pivot point so as to bring the rounded end portion 9 into the recesses 10. At the same time, the disk 54 is also rotated in a clockwise direction to such an extent that the port 55 is brought into registry with the one end $45^a$ of the channel 45, and the oppositely disposed angular port 55′ will establish communication between the one end $47^a$ of the channel 47 and the branch portion $52^a$ of the by-pass. The parts are placed in such position of adjustment prior to the depression of the clutch pedal 3. With the parts in such position, the operator then depresses the clutch pedal 3, with the result that the plunger 19 is caused to descend in the cylinder 17, as viewed in Fig. 13, and to effect compression of the fluid therein. This compression is transmitted through the pipe 22, thence into the chamber 53, through the port 55 and into the channel 45. Be it remembered that the lateral adjustment of the plunger rod 8 by the rotary movement of the cam 42 has not yet disturbed the position of the valve 59 illustrated in Fig. 8. This is by virtue of the lost motion permitted between the pin 64 and the slot 65. Moreover, the valve 66 has already been closed by adjustment of disk 54. From the channel 45, the compression of the fluid is transmitted through the pipe 48 into the cylinder 15 so as to impress itself upon the rear side of the plunger 14. Such compression at this point moves the plunger 14 from neutral position to the left, as viewed in Fig. 5, and thereby causes the gears to be shifted from "neutral" to "low". Such movement of the plunger rod 8 will, through the pin and slot connection 64 and 65, cause a rotatable adjustment of the valve 59 in a clockwise direction so as to uncover the ends $45^b$ and $47^b$ of the channels 45 and 47 which open into the chamber 51. However, the compression of the fluid is prevented from escaping out through the by-pass 52 from the chamber 51 by means of the valve 66 which upon rotatable adjustment of the disk 54 has been caused to effectively engage the side wall of the by-pass 52 and thereby prevent passage of the fluid past this point. Passage through channel 46 is also prevented by adjustment of port 63 out of registry with $46^a$. Movement of the plunger 14 in the manner just described will force the compression fluid out through the pipe 49 and through the channel 47, thence through the angular port 55′ into the branch $52^a$ of the by-pass from which the fluid is permitted to pass out through the pipe 23 into the upper part of the cylinder 17. Thus, the compression of the fluid in the manner described and the distribution of the same over the course just outlined is effective in establishing the gear ratio known as first or low gear. Upon release of pedal 3, the gears will remain in this position.

Assuming now that it is desired to shift from low to reverse gear, the operator now depresses lever 26 so as to permit adjustment of the lever arm 25 to the point marked "reverse" upon the rack 24. Such manipulation will cause further rotatable adjustment of the disk 54 in a clockwise direction so as to bring the port 57 into registry with the one end $47^a$ of the channel 47 and at the same time, cause the angular port 57′ to establish communication between the end $45^a$ of channel 45 and the one end of the by-pass 52. Then upon depression of the clutch pedal, the compression created within the cylinder 17 is transmitted through the pipe 22 to the chamber 53, thence through the port 57, the channel 47, and pipe connection 49, into the one end of the cylinder 15 so as to force the plunger 14 to the right, as viewed in Fig. 5. It is understood that during this adjustment the cam 42 remains in engagement with the cooperating projection 43 so as to maintain the cylinder 15 and the rounded end 9 in the same position to which originally moved upon establishing low gear combination. The movement of plunger 14 to the right, as viewed in Fig. 5, will thereby cause the gear shifting rod 12 to move to the right and to establish the reverse gear combination. During such movement of the plunger rod 8, the valve 59 is caused to move in a counter-clockwise direction, as viewed in Fig. 8, and to pass beyond closed position, but the valve 66 has already been closed by the adjustment of disk 54, and port 63 has been closed by adjustment of disk 54. In this way, there is prevented any loss of the fluid compression which is relied upon for the accomplishment of the adjustment as now described. Upon release of the clutch pedal, the gears will remain in the position to which they have been adjusted.

Assuming that it is desired to change the gear combination from "low" to "second", or "intermediate", the lever arm 25 is adjusted from the "low" position to the position indicated as "second" upon the rack 24. This adjustment can be effected without depressing lever 26. Such adjustment causes rotation of the disk 54 in a counter-clockwise direction to such an extent that the port 56 will register with the one end 47ᵃ of the channel 47, and the diametrically disposed angular port 56′ will establish communication between the end 45ᵃ of channel 45 and the one end of the by-pass 52. Then upon depression of the clutch pedal, the fluid is compressed within the cylinder 17 whence it is discharged through the pipe 22 into the chamber 53, through the port 56, the channel 47, the pipe 49, and into the left hand end of the cylinder 15, as viewed in Fig. 5. The piston 14 is thereby moved toward the right through neutral position at which point the plunger rod 8 is caused to engage in the notch 11 by virtue of the spring 44 upon release of the cam 42 from effective engagement. Then further movement of the piston 14 will cause the gear rod 13 to be moved toward the right, as viewed in Fig. 5, and to thereby establish the middle gear combination. Such movement of the piston 14 causes discharge of the fluid out through the pipe 48, the channel 45, the angular port 56′, the by-pass 52, thence through the pipe 23 to the upper side of the plunger 19. Here again there should be kept in mind the effect of the valve 66 in preventing escape of the pressure except along the course indicated, even though the valve 59 is opened by movement of rod 8. When arm 25 has been set in "second" position, it can not be moved to "high" without depressing lever 26 so as to permit the projection 27 to pass over the shoulders of the depression.

Then in order to shift from intermediate to high gear, the lever 26 is depressed and the arm 25 is adjusted to the corresponding point indicated upon the rack 24 so as to rotate the disk 54 in a further counter-clockwise direction and thereby bring the port 58 into registry with the one end 45ᵃ of the channel 45 and at the same time, the angular port 58′ establishes communication between the end 47ᵃ of the channel 47 and the branch 52ᵃ of the by-pass 52. With such line of communication established, the clutch pedal upon being depressed, will cause the compressed fluid in the cylinder 17 to be distributed through the pipe 22 into the chamber 53 thence through port 58, channel 45, pipe 48, into the one end of cylinder 15 so as to move the plunger 14 to the left, as viewed in Fig. 5, and thereby move the gear rod to the left to establish the high gear ratio.

In order to shift the gears from either "low" or "high" to neutral position, this may be accomplished by first shifting the lever 25 to the neutral position indicated on the rack 24, without depressing lever 26, and then depressing the clutch pedal. Such adjustment of the lever 25 will bring the disk 54 to the position indicated in Fig. 7 so as to register the port 63 with the one end 46ᵃ of the channel 46 which opens at its other end into chamber 51. At this time, valve 59 is open and the valve 66 engages in the notch 69 so as to permit free passage of the fluid throughout the entire by-pass 52. With such circuit of fluid distribution established, depression of the clutch pedal will cause the fluid to pass from the cylinder 17 through the pipe 22, chamber 53, port 63, channel 46 into chamber 51, thence through channel 47, pipe 49, to cylinder 15, through pipe 48, channel 45, chamber 51, by-pass 52, pipe 23 and to cylinder 17. Thus, the pressure is equalized upon the two sides of plunger 14, and the return of valve 59 to closed position, corresponding to "neutral", indicated in Fig. 7, will then ensure the continuance of such neutral position should the clutch pedal be depressed without making any adjustment for change of gear ratio. That is, with valve 59 closed and the valve 66 open, depression of the clutch pedal will merely cause compression of the fluid through the pipe 22, chamber 53, port 63, channel 46, chamber 51, by-pass 52, and pipe 23, back to cylinder 17. Since this circuit does not include the channels 45 and 47, there will be no movement of the plunger 14. Projection 27 may rest in a slight depression when in neutral position.

Likewise in order to shift from second or reverse gear to "neutral", the arm 25 is properly set without depressing lever 26. Thus, the disk 54 is set in the same manner as just explained and the same circuit is established so that upon depression of the clutch pedal, compression will be exerted from cylinder 17 through pipe 22, chamber 53, port 63, channel 46, chamber 51, channel 45, pipe 48, cylinder 15, out through pipe 49, channel 47, chamber 51, by-pass 52, and pipe 23 back to cylinder 17. Thus the pressure is equalized upon the two sides of plunger 14 and the valve 59 is closed by movement of plunger rod 8. Then, with the parts in such position and until further adjustment thereof, the depression of the clutch pedal will merely cause compression of the fluid through the distributor and will not affect the plunger 14, as will be understood from the explanation immediately preceding.

It is to be understood that upon shifting from either low gear or reverse gear to "neutral", the rounded end of rod 8 will be automatically moved into engagement with notch 11.

In case of shifting the gears from either "reverse" to "low" or from "high" to "intermediate". the setting of arm 25 may be facilitated by depressing lever 26 so as to cause projection 27ᵃ to engage the shoulder of the corresponding depression when the arm 25 has reached proper position.

In case rod 29 should extend along the inside of the steering column, then the arm 25 may be located at the center of the steering wheel.

From the present disclosure, it will be seen that I have not only dispensed with the familiar gear-shift lever. but I have devised a mechanism which is of comparatively simple construction and which contains a minimum number of parts that might be apt to require attention or replacement. Furthermore, the several parts of the mechanism may be recognized as units to which access may be readily had and which can be removed and replaced, as may be required. without disassembling the other parts of the mechanism. Likewise, the original installation of the several parts of the mechanism is greatly facilitated. Other advantages will suggest themselves to those who are familiar with the art to which the present invention relates.

What I claim is:

1. In a device of the class described, the combination of an engine, a shaft adapted to be driven thereby, a clutch connection and gear transmission between said engine and shaft, a reciprocatable plunger operatively connected to said gear transmission for effecting change in the gear ratio, a reciprocatable plunger operatively connected to the clutch control, means including a distributor for transmitting fluid pressure from said second-named plunger to said first-named plunger, a single means for adjusting said distributor so as to establish proper connections for the fluid pressure according to the gear ratio desired, and for adjusting said first-named plunger laterally in one direction in accordance with the adjustment of the distributor, and means for automatically effecting lateral adjustment thereof in the opposite direction.

2. In a device of the class described, the combination of an engine, a shaft adapted to be driven thereby, a clutch connection and gear transmission between said engine and shaft, a laterally adjustable, reciprocatable plunger operatively connected to said gear transmission for effecting change in the gear ratio, a reciprocatable plunger operatively connected to the clutch control, means including a distributor for transmitting fluid pressure from said second-named plunger to said first-named plunger, means for adjusting said distributor so as to establish proper connections for the fluid pressure according to the gear ratio desired and for simultaneously adjusting said first-named plunger laterally in one direction in accordance with the adjustment of the distributor, and means for automatically effecting lateral adjustment of said first-named plunger in the opposite direction.

3. In a device of the class described, the combination of an engine, a shaft adapted to be driven thereby, a clutch connection and gear transmission between said engine and shaft, a laterally adjustable, reciprocatable plunger operatively connected to said gear transmission for effecting change in the gear ratio, a reciprocatable plunger operatively connected to the clutch control, means including a distributor for transmitting fluid pressure from said second-named plunger to said first-named plunger, rotatable means for adjusting said distributor so as to establish proper connections for the fluid pressure according to the gear ratio desired, cam means actuated by said rotatable means for adjusting said first-named plunger laterally in one direction in accordance with the adjustment of the distributor, and spring means for automatically effecting lateral adjustment of said first-named plunger in the opposite direction.

4. In a device of the class described, the combination of an engine, a shaft adapted to be driven thereby, a clutch connection and gear transmission between said engine and shaft, fluid means for changing the gear ratio in said transmission, a unitary form of adjustable distributor for selecting the path of the fluid pressure to be effected according to the gear ratio desired, said distributor comprising two chambers, channels connecting said chambers, a rotary valve in each of said chambers for controlling the fluid pressure therethrough and means operatable in conjunction with the clutch for placing the fluid under pressure.

5. In a device of the class described, the combination of an engine, a shaft adapted to be driven thereby, a clutch connection and gear transmission between said engine and shaft, fluid means for changing the gear ratio in said transmission, a unitary form of adjustable distributor for selecting the path of the fluid pressure to be effected according to the gear ratio desired, said distributor comprising two chambers, channels connecting said chambers, a rotary valve in each of said chambers for controlling the fluid pressure therethrough, said channels and valves being so constructed and arranged that fluid pressure may be rendered effective for the several gear ratios and ineffective for neutral position thereof, and means operatable in conjunction with the clutch for placing the fluid under pressure.

6. In a device of the class described, the combination of an engine, a shaft adapted to be driven thereby, a clutch connection and gear transmission between said engine and shaft, fluid-actuated plunger means for changing the gear ratio in said transmission, a unitary form of adjustable distributor for selecting the path of the fluid pressure to be effected according to the gear ratio desired, said distributor comprising two chambers, channels connecting said chambers, a rotary valve in each of said chambers for controlling the fluid pressure therethrough, fluid pressure connections between said distributor and the opposite sides of said plunger, said channels and valves being so constructed and arranged that fluid pressure may be communicated to said plunger means for effecting the several gear ratios and will be excluded from said plunger means while in neutral position, and means operatable in conjunction with the clutch for placing the fluid under pressure.

7. In a device of the class described, the combination of an engine, a shaft adapted to be driven thereby, a clutch connection and gear transmission between said engine and shaft, a fluid-actuated means including a single piston operable at all times as a single piston and operatably connected to said gear transmission for effecting change in the gear ratio, a single fluid compression means operatively connected to the clutch control, means including a distributor for transmitting fluid pressure from said compression means to said fluid-actuated means, and means for adjusting said distributor so as to establish proper connections for the fluid pressure according to the gear ratio desired and to neutralize the effect of said fluid-actuated means so as to return the gear transmission to neutral position.

8. In a device of the class described, the combination of an engine, a shaft adapted to be driven thereby, a clutch connection and gear transmission between said engine and shaft, a reciprocatable plunger operatively connected to said gear transmission for effecting change in the gear ratio, a single reciprocatable plunger operable at all times as a single plunger and operatively connected to the clutch control, means including a distributor for transmitting fluid pressure from said second-named plunger to said first-named plunger, and means for adjusting said distributor so as to establish proper connections for the fluid pressure according to the gear ratio desired, and to equalize the pressure upon the opposite sides of said first-named plunger so as to return the gear transmission to neutral position.

9. In a device of the class described, the combination of an engine, a shaft adapted to be driven thereby, a clutch connection and gear transmission between said engine and shaft, means operatively connected to said gear transmission for effecting change in the gear ratio, said means being capable of pivotal lateral adjustment according to and preparatory to the change desired in the gear ratio control means therefor operatively connected to the clutch control, means for transmitting energy from said control means to said first-named means, adjustable means for establishing proper control connections according to the gear ratio desired and for simultaneously effecting pivotal adjustment of said first-named means laterally in one direction in accordance with the adjustment of said adjustable means, and means for automatically effecting lateral pivotal adjustment of said first-named means in the opposite direction.

10. In a device of the class described, the combination of an engine, a shaft adapted to be driven thereby, a clutch connection and gear transmission between said engine and shaft, means operatively connected to said gear transmission for effecting change in the gear ratio for both forward and reverse drive, said means being capable of lateral adjustment according to and preparatory to the change desired in the gear ratio, control means therefor operatively connected to the clutch control, a single spring means operable only for effecting return movement of said adjustable means, means for transmitting energy from said control means to said first-named means, adjustable means for establishing proper control connections according to the gear ratio desired and for simultaneously adjusting said first-named means laterally in one direction in accordance with the adjustment of said adjustable means, and means for automatically effecting lateral adjustment of said first-named means in the opposite direction.

11. In a device of the class described, the combination of an engine, a shaft adapted to be driven thereby, a clutch connection and gear transmission between said engine and shaft, means operatively connected to said gear transmission for effecting change in the gear ratio, said means being capable of pivotal lateral adjustment according to and preparatory to the change desired in the gear ratio, means having direct engagement with said laterally adjustable means for effecting adjustment thereof, control means therefor operatively connected to the clutch control, means for transmitting energy from said control means to said first-named means, adjustable means for establishing proper control connections according to the gear ratio desired and including a cam for simultaneously adjusting said first-named means laterally in one direction in accordance with the adjustment of said adjustable means, and means for automatically effecting lateral adjustment of said first-named means in the opposite direction.

12. In a device of the class described, the combination of an engine, a shaft adapted to be driven thereby, a clutch connection and gear transmission between said engine and shaft, means operatively connected to said gear transmission for effecting change in the gear ratio, said means being capable of pivotal lateral adjustment according to and preparatory to the change desired in the gear ratio, pivoted, cam means operable through a fixed plane for effecting said lateral adjustment, control means for the said laterally adjustable means operatively connected to the clutch control, means for transmitting energy from said control means to said first-named means, adjustable means for establishing proper control connections according to the gear ratio desired and for simultaneously actuating said cam means for adjusting said first-named means laterally in one direction in accordance with the adjustment of said adjustable means, and means for automatically effecting lateral adjustment of said first-named means in the opposite direction.

13. In a device of the class described, the combination of an engine, a shaft adapted to be driven thereby, a gear transmission between said engine and shaft, a reciprocatable plunger operatively connected to said gear transmission for effecting change in the gear ratio, said plunger being capable of lateral adjustment according to and preparatory to the change desired in the gear ratio, means including a distributor for transmitting fluid pressure to said plunger, a single means for adjusting said distributor so as to establish proper connections for the fluid pressure according to the gear ratio desired and for adjusting said plunger laterally in one direction in accordance with the adjustment of the distributor, and means for automatically effecting lateral adjustment thereof in the opposite direction.

14. In a device of the class described, the combination of an engine, a shaft adapted to be driven thereby, a gear transmission between said engine and shaft, a reciprocatable plunger operatively connected to said gear transmission for effecting change in the gear ratio, said plunger being capable of lateral adjustment according to and preparatory to the change desired in the gear ratio, means including a distributor for transmitting energy to said plunger, a single means for adjusting said distributor so as to establish proper connections for the transmission of energy according to the gear ratio desired and for adjusting said plunger laterally in one direction in accordance with the adjustment of the distributor, and means for automatically effecting lateral adjustment thereof in the opposite direction.

15. In a device of the class described, the combination of an engine, a shaft adapted to be driven thereby, a gear transmisison between said engine and shaft, a reciprocatable plunger operatively connected to said gear transmission for effecting change in the gear ratio, said plunger being capable of lateral adjustment according to and preparatory to the change desired in the gear ratio, means including a distributor for transmitting energy to said plunger, adjustable means for establishing proper control connections through the distributor according to the gear ratio desired and for simultaneously adjusting said plunger laterally in one direction in accordance with the adjustment of the distributor, and means for automatically effecting lateral adjustment thereof in the opposite direction.

KENNETH W. GASKILL.